United States Patent
Hamada (10) Patent No.: US 7,449,806 B2
(45) Date of Patent: Nov. 11, 2008

(54) BRUSHLESS AUTOMOTIVE ALTERNATOR HAVING IMPROVED STRUCTURE FOR MINIMIZING TEMPERATURE OF AUXILIARY RECTIFYING ELEMENTS

(75) Inventor: Hiroshi Hamada, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/654,627

(22) Filed: Jan. 18, 2007

(65) Prior Publication Data

US 2007/0170821 A1  Jul. 26, 2007

(30) Foreign Application Priority Data

Jan. 20, 2006 (JP) .............................. 2006-012247

(51) Int. Cl.
*H02K 11/04* (2006.01)
*H02K 19/36* (2006.01)

(52) U.S. Cl. ....................................... 310/68 D; 310/58

(58) Field of Classification Search .............. 310/65 D, 310/68 D; 290/38 R
See application file for complete search history.

(56) References Cited

U.S. PATENT DOCUMENTS

| | | | | |
|---|---|---|---|---|
| 4,162,419 | A * | 7/1979 | DeAngelis | 310/266 |
| 4,221,982 | A * | 9/1980 | Raver et al. | 310/59 |
| 4,720,645 | A * | 1/1988 | Stroud | 310/68 D |
| 4,739,204 | A * | 4/1988 | Kitamura et al. | 310/68 D |
| 5,798,586 | A * | 8/1998 | Adachi | 310/54 |
| 6,661,662 | B2 * | 12/2003 | DeNardis | 361/709 |
| 6,707,691 | B2 * | 3/2004 | Bradfield | 363/145 |
| 2002/0041476 | A1 * | 4/2002 | Petris | 361/103 |
| 2002/0043885 | A1 * | 4/2002 | Asao et al. | 310/90 |
| 2002/0060502 | A1 * | 5/2002 | Irie | 310/68 D |
| 2003/0015928 | A1 * | 1/2003 | Asao | 310/68 D |
| 2004/0256925 | A1 * | 12/2004 | Morrissette et al. | 310/68 B |
| 2005/0082922 | A1 * | 4/2005 | Armiroli et al. | 310/68 D |

FOREIGN PATENT DOCUMENTS

JP  A 60-109748  6/1985

* cited by examiner

*Primary Examiner*—Burton Mullins
*Assistant Examiner*—Alex W Mok
(74) *Attorney, Agent, or Firm*—Oliff & Berridge, PLC (57) ABSTRACT

According to the present invention, a brushless alternator includes a stationary field winding, a rotor with a rotary shaft, a bearing rotatably supporting an end portion of the rotary shaft, a stator, a protective cover, and a rectifier covered by the protective cover. The rectifier includes a plurality of main rectifying elements for providing a DC output of the alternator, a heat sink having the main rectifying elements provided thereon and working to dissipate heat generated by the main rectifying elements, and a plurality of auxiliary rectifying elements for supplying DC field current to the field winding. The auxiliary rectifying elements are arranged in an axial space between the bearing and the protective cover and kept away from the heat sink. With such an arrangement, it is possible to minimize heat transfer from the heat sink to the auxiliary rectifying elements, thereby minimizing the temperature of the auxiliary rectifying elements.

7 Claims, 6 Drawing Sheets

BRUSHLESS AUTOMOTIVE ALTERNATOR HAVING IMPROVED STRUCTURE FOR MINIMIZING TEMPERATURE OF AUXILIARY RECTIFYING ELEMENTS

CROSS-REFERENCE TO RELATED APPLICATION

This application is based on and claims priority from Japanese Patent Application No. 2006-12247, filed on Jan. 20, 2006, the content of which is hereby incorporated by reference into this application.

BACKGROUND OF THE INVENTION

1. Technical Field of the Invention

The present invention relates generally to brushless automotive alternators for use in, for example, trucks, construction machines, and agricultural machines.

More particularly, the invention relates to a brushless automotive alternator which has an improved structure for minimizing the temperature of auxiliary rectifying elements included therein.

2. Description of the Related Art

With recent development of automotive engines for coping with emission control regulations, automotive alternators have come to operate under higher ambient temperatures in the engine compartments.

Moreover, to meet recent requirements for employing more security devices, providing additional power sources, and improving comfort, electric loads on automotive alternators have considerably increased.

There are two different automotive alternator types. One is brushed type for passenger cars, and the other is brushless type for trucks, construction machines, and agricultural machines.

In general, trucks are required to be able to travel long distances, and construction machines and agricultural machines are required to be able to operate under severe conditions (e.g., dusty conditions).

Accordingly, brushless automotive alternators are now required to be able to withstand higher ambient temperatures, output more power, and have a long service life.

To increase power output of automotive alternators, several techniques have been developed, for example, increasing the outer diameter of the stator, increasing the lamination thickness of the stator core, and lowering the resistance of the stator winding.

However, with increase in the power output of an automotive alternator, heat generated in the rectifier of the alternator increases accordingly, thus causing the temperature of the rectifier to significantly increase.

Japanese Patent First Publication No. S60-109748 discloses an automotive alternator, which includes a rectifier having main diodes for providing DC power output of the alternator and auxiliary diodes for providing DC field current to the field winding. The auxiliary diodes are arranged on a main (top or bottom) surface of a heat sink of the rectifier.

However, with such an arrangement, when the temperature of the rectifier increases with increase in the power output of the alternator, the temperature of the auxiliary diodes increases accordingly. This is because, though the auxiliary diodes generate only a small amount of heat by themselves, they receive a large amount of heat transferred from the heat sink which carries the main diodes thereon.

On the other hand, for brushless automotive alternators, especially for those for North American market which have a normalized dimension of stays for installation, the alternator outer diameter is generally limited, and thus the distances of a bearing supporting the rotor with the stator and with the rectifier are accordingly limited. Consequently, the temperature of the bearing also increases with increase in the power output of the alternator.

Accordingly, due to the auxiliary diodes and bearing whose temperatures increase with increase in the power output, it is difficult to secure a long service life of a brushless automotive alternator.

To suppress temperature rises of the auxiliary diodes and bearing, there has been disclosed a method of increasing the airflow rate and/or speed of a cooling fan provided in the alternator. However, due to the limitation on the alternator outer diameter as described above, there is accordingly a limitation on increasing the outer diameter of the cooling fan. Further, due to constraints on the strength of blades of the cooling fan, there is also a limitation on increasing the number of blades and/or axial area of the cooling fan.

Accordingly, there is a limitation on suppressing temperature rises of the auxiliary diodes and bearing by using the above method.

SUMMARY OF THE INVENTION

The present invention has been made in view of the above-mentioned problems.

It is, therefore, a primary object of the present invention to provide a brushless alternator which has an improved structure for minimizing the temperature of auxiliary rectifying elements (e.g., diodes) included therein.

According to the present invention, there is provided a brushless alternator which includes: a stationary field winding working to create a magnetic flux; a rotor having a rotary shaft and working to create a rotating magnetic field with the magnetic flux created by the field winding; a bearing rotatably supporting an end portion of the rotary shaft; a stator working to generate an AC power in the rotating magnetic field created by the rotor; a protective cover; and a rectifier covered by the protective cover.

The rectifier includes a plurality of main rectifying elements, a heat sink, and a plurality of auxiliary rectifying elements. The main rectifying elements work to rectify the AC power generated by the stator to a first DC power that is to be output from the alternator to external. The heat sink has the main rectifying elements provided thereon and works to dissipate heat generated by operation of the main rectifying elements. The auxiliary rectifying elements work to rectify the AC power generated by the stator to a second DC power that is to be used to energize the field winding. The auxiliary rectifying elements are arranged in an axial space between the bearing and the protective cover and kept away from the heat sink.

With the above arrangement, it is possible to minimize heat transfer from the heat sink to the auxiliary rectifying elements, thereby minimizing the temperature of the auxiliary rectifying elements.

According to a further implementation of the invention, in the brushless alternator, the heat sink is arranged outside the auxiliary rectifying elements in the radial direction of the rotary shaft and away from the auxiliary rectifying elements in the axial direction of the rotary shaft.

With the above arrangement, the auxiliary rectifying elements can be prevented from suffering directly from heat dissipated by the heat sink.

In the brushless alternator, the auxiliary rectifying elements are so arranged as not to align with each other in the axial direction of the rotary shaft.

With the above arrangement, the auxiliary rectifying elements will not align with each other in the direction of a cooling air flow created by a cooling fan that is mounted on the rotary shaft, thus avoiding reduction of the cooling effect.

In the brushless alternator, the protective cover has an air intake hole formed therethrough which is in alignment with one of the auxiliary rectifying elements in the axial direction of the rotary shaft.

With the above formation, it is possible to introduce fresh cooling air from the outside of the protective cover (i.e., the outside of the alternator) directly to the auxiliary rectifying elements and the bearing, thereby effectively cooling them.

In the brushless alternator, there is further provided a barrier for blocking heat transfer from the heat sink to the auxiliary rectifying elements.

As an example, the rectifier further includes a terminal block that includes a plurality of terminals for making electrical connection to the main and auxiliary rectifying elements and a retention portion for retaining the auxiliary rectifying elements. The retention portion has a concave shape with a bottom surface, on which the auxiliary rectifying elements are arranged, and a side wall that serves as the barrier to block heat transfer from the heat sink to the auxiliary rectifying elements.

With such a barrier, it is possible to further effectively decrease the temperature of the auxiliary rectifying elements and the bearing.

In the brushless alternator, the protective cover has an air guide wall formed therein for guiding cooling air from outside of the alternator to the auxiliary rectifying elements.

With such an air guide wall, it is possible to reliably introduce fresh cooling air from the outside of the protective cover directly to the auxiliary rectifying elements and the bearing, thereby further effectively cooling them.

It is preferable that the brushless alternator be used in a motor vehicle.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

The preferred embodiment of the present invention will be described hereinafter with reference to FIGS. 1-7.

Figure 1:
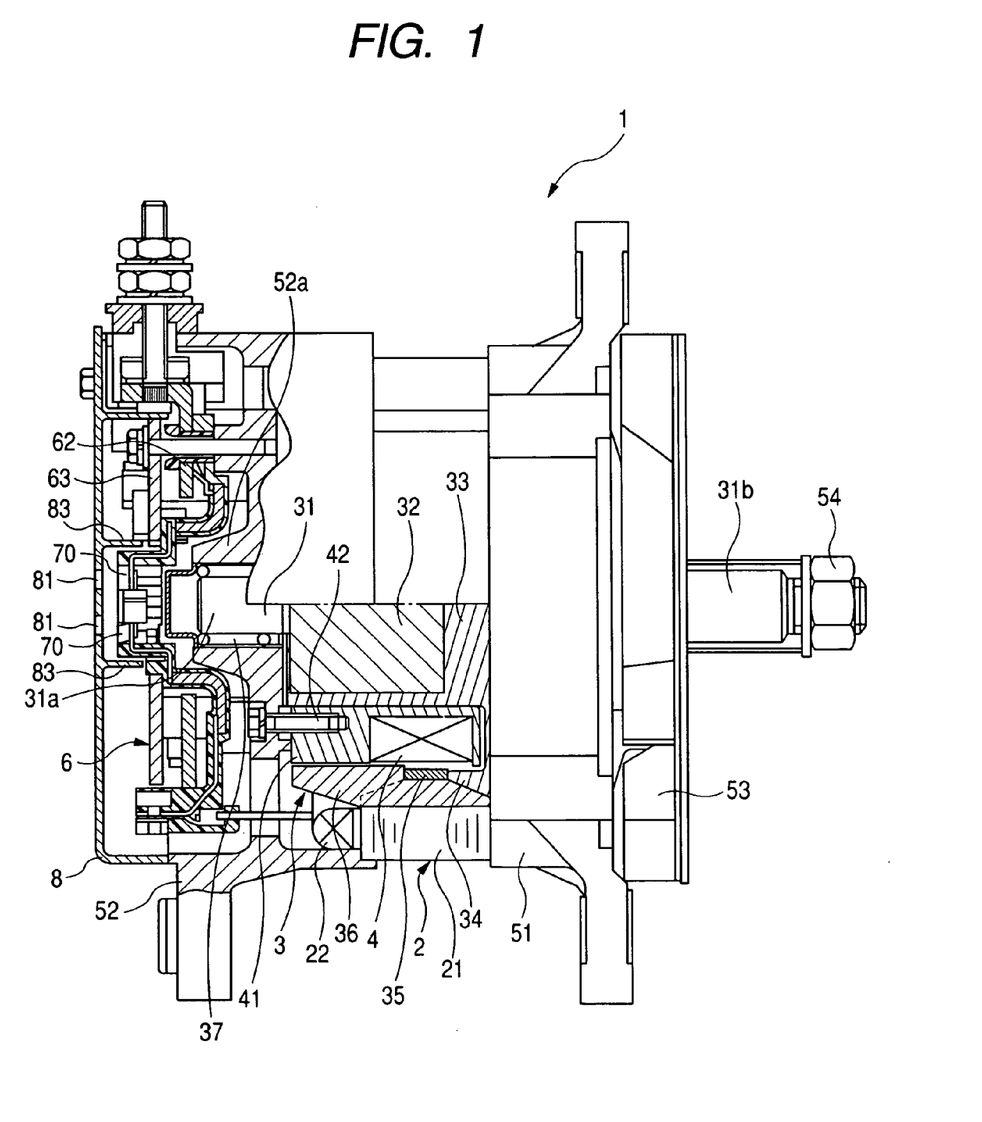
FIG. 1 is a partially cross-sectional view showing the overall configuration of a brushless automotive alternator according to an embodiment of the invention.
Figure 2:
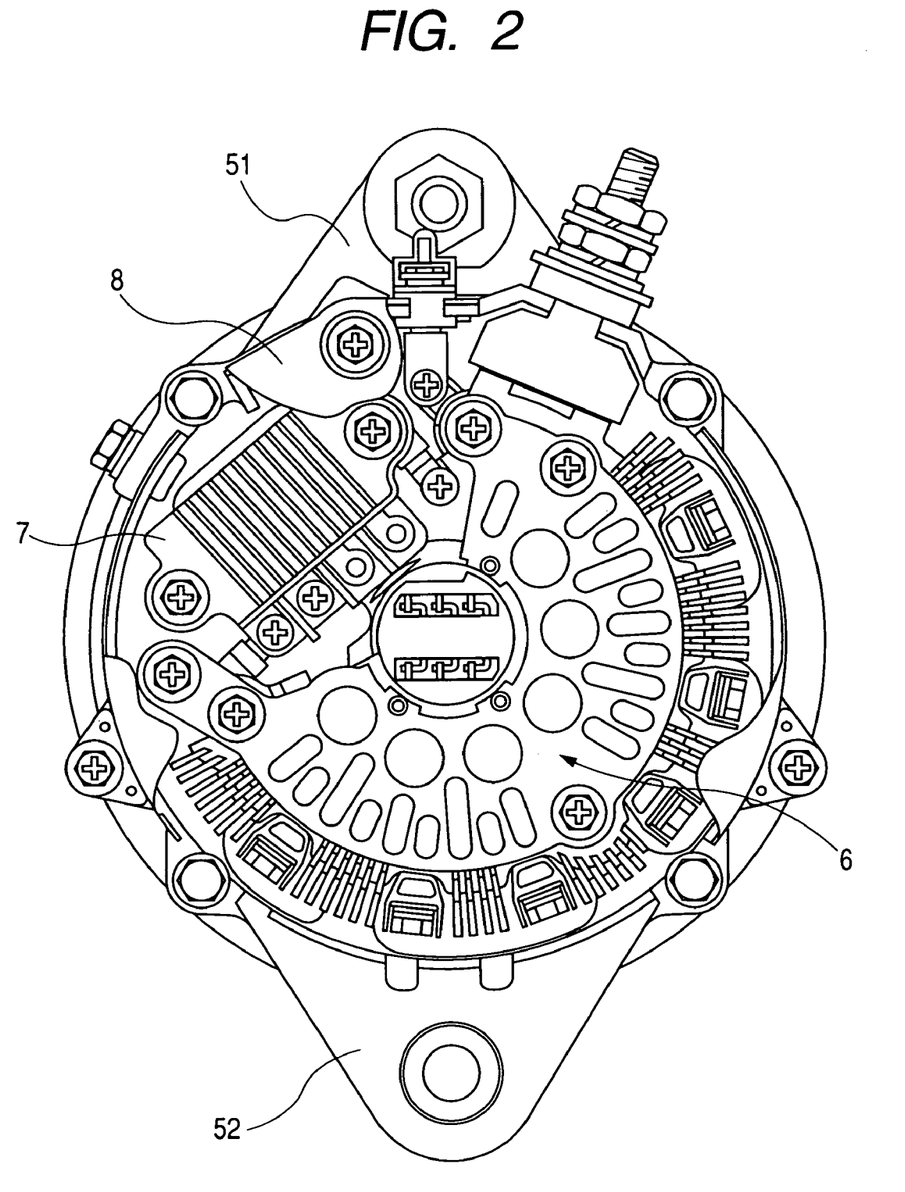
FIG. 2 is a rear end view of the brushless automotive alternator omitting the majority of a rear cover of the alternator.

FIGS. 1 and 2 together show the overall configuration of a brushless automotive alternator 1 according to an embodiment of the invention.

As shown in FIGS. 1 and 2, the alternator 1 includes a stator 2, a rotor 3, a field winding 4, a front housing 51, a rear housing 52, a rectifier 6, a regulator 7, and a rear cover 8.

The stator 2, which works as an armature, includes a stator core 21 and a three-phase stator winding 22 wound around the stator core 21.

The rotor 3, which works as a field, is arranged so as to be surrounded by the stator 2.

The rotor 3 includes a rotary shaft 31, rotating yoke portions 32 and 33 that are mounted on the rotary shaft 31, a claw pole portion 34 formed integrally with the rotating yoke portion 33, and a claw pole portion 36 that is connected to the claw pole portion 34 through an annular supporting member 35.

The rotary shaft 31 is rotatably supported by a bearing 37 that is mounted on a rear end portion 31a of the rotary shaft 31.

The field winding 4 is wound around a fixed yoke portion 41. The fixed yoke portion 41 is cylindrical in shape and fixed to the rear housing 52 by means of bolts 42.

The field winding 4, the fixed yoke portion 41, and the rotor 3 together constitute the field. More specifically, the field winding 4 creates a magnetic flux when energized; with the magnetic flux, the rotor 3 creates a rotating magnetic field which induces three-phase AC current in the three-phase stator winding 22 of the stator 2.

The front and rear housings 51 and 52 are provided to accommodate therein and support the stator 2 and the rotor 3. The above-described bearing 37 is press-fitted in a bore formed in a rear end portion 52a of the rear housing 52, and thus fixed to the rear housing 52. From the front housing 51, a front end portion 31b of the rotary shaft 31 protrudes so as to allow a cooling fan 53 and a pulley (not shown) to be mounted thereon by means of a nut 54.

The rectifier 6 works to full-wave rectify a three-phase AC power output from the three-phase stator winding 22. The detailed configuration of the rectifier 6 is to be described latter.

The regulator 7 works to regulate an output voltage of the alternator 1 through controlling field current supplied to the field winding 4.

The rear cover 8 is fixed to the rear housing 52 to cover the rectifier 6 and the regulator 7 from a rear side of the alternator 1, thereby protecting them from foreign matters, such as water and dust. The detailed configuration of the rear cover 8 is also to be described later.

Figure 3:
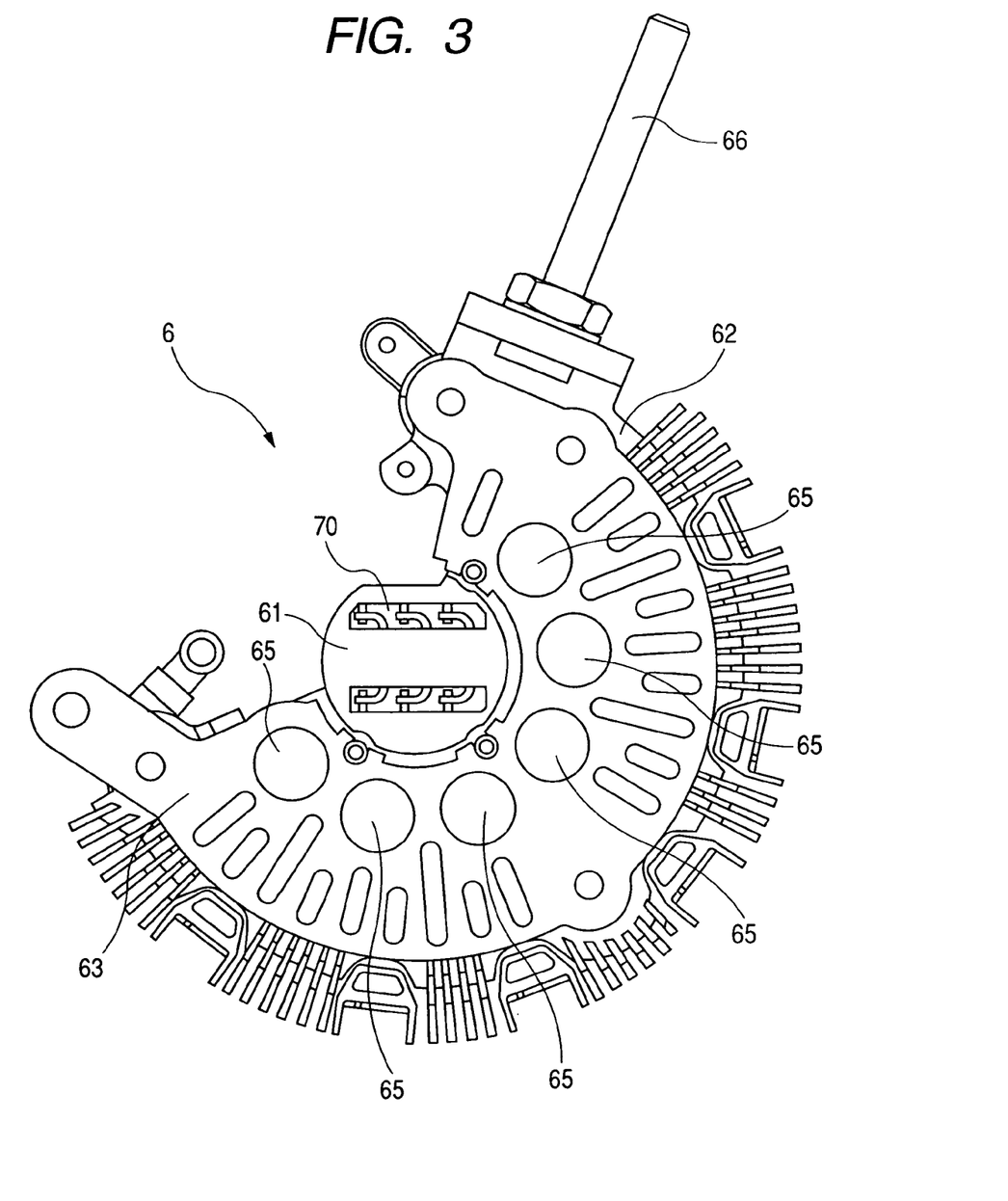
FIG. 3 is a rear end view of a rectifier of the brushless automotive alternator.
Figure 4:
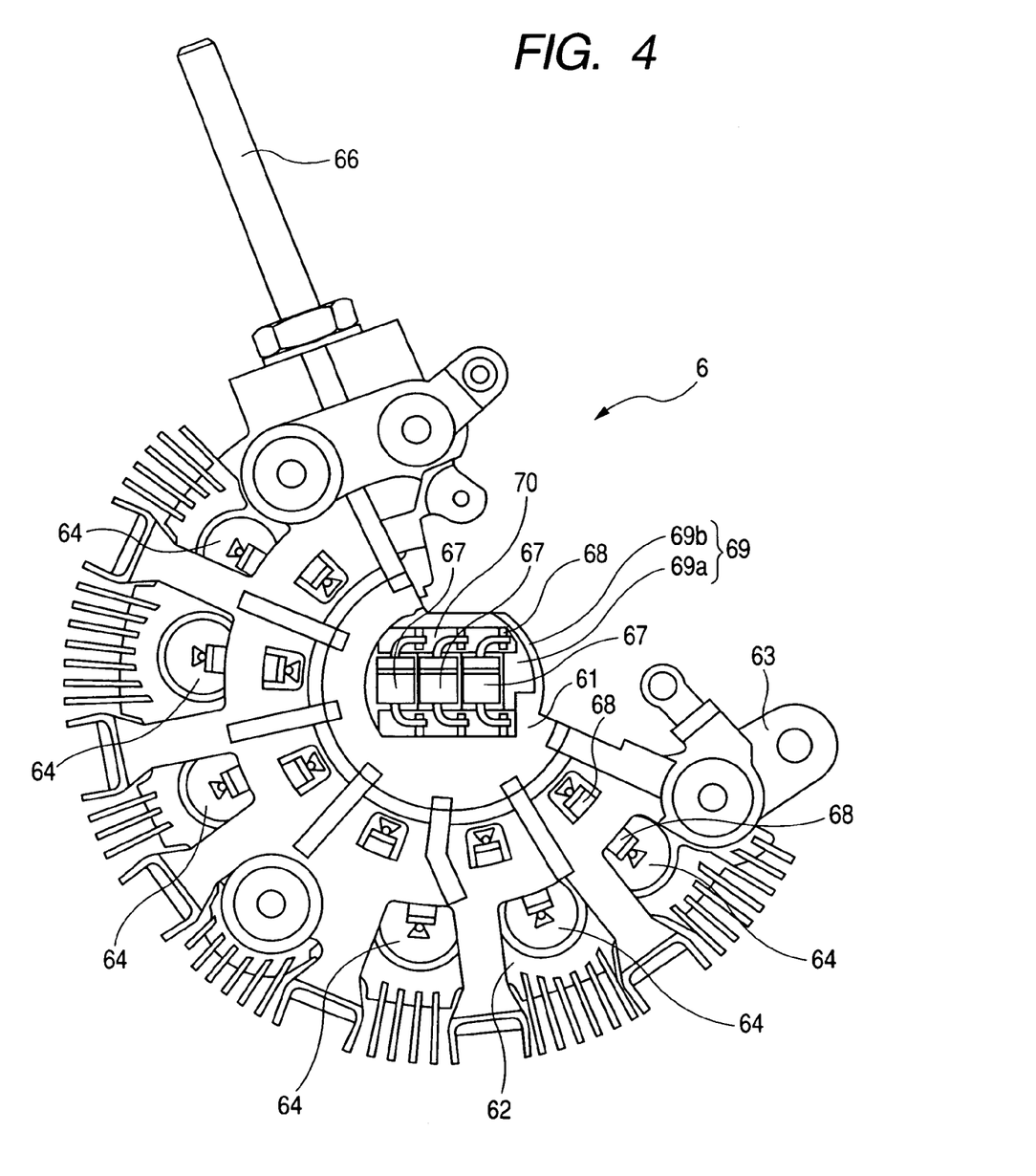
FIG. 4 is a front end view of the rectifier.
Figure 5:
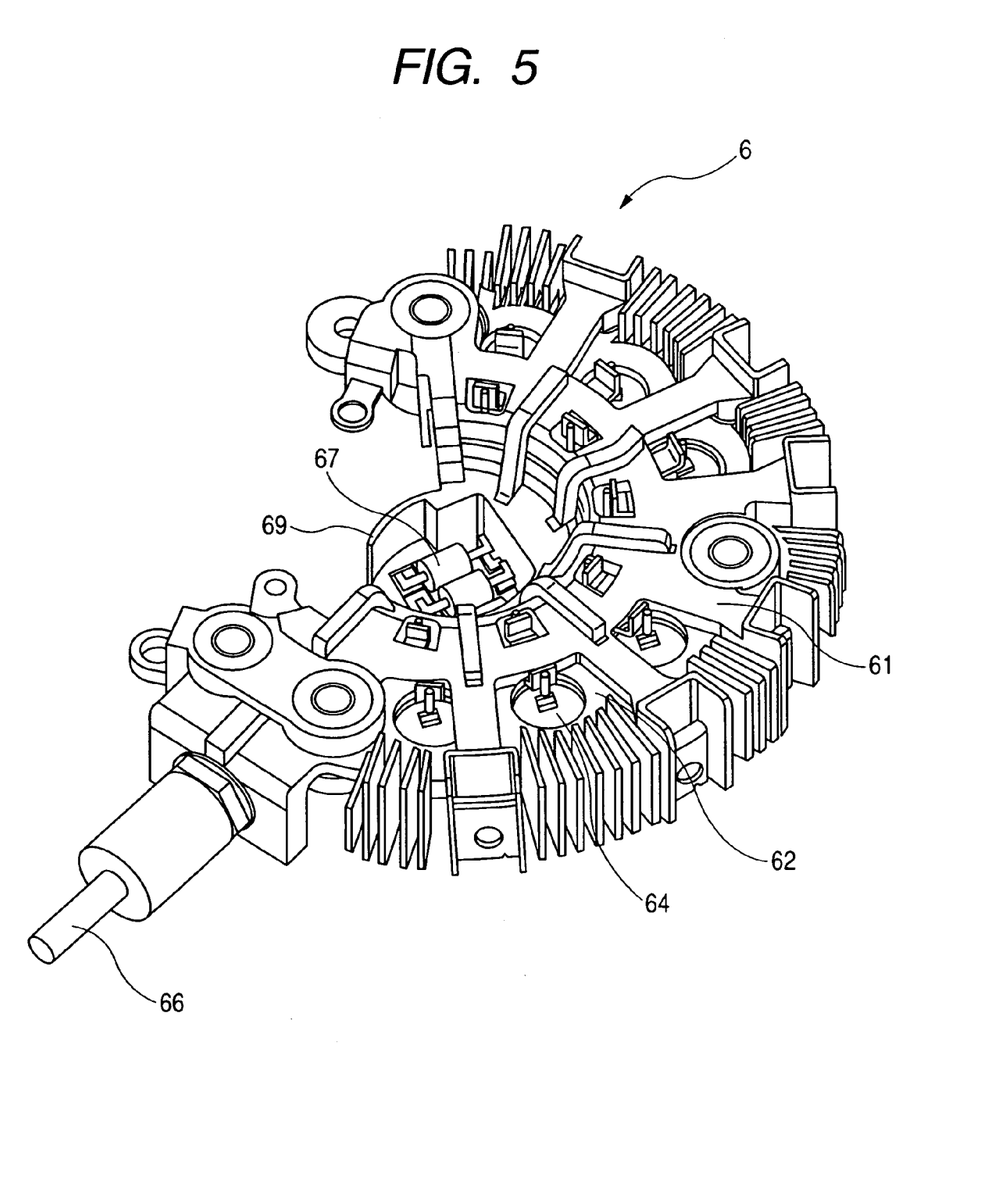
FIG. 5 is a perspective view of the rectifier.
Figure 6:
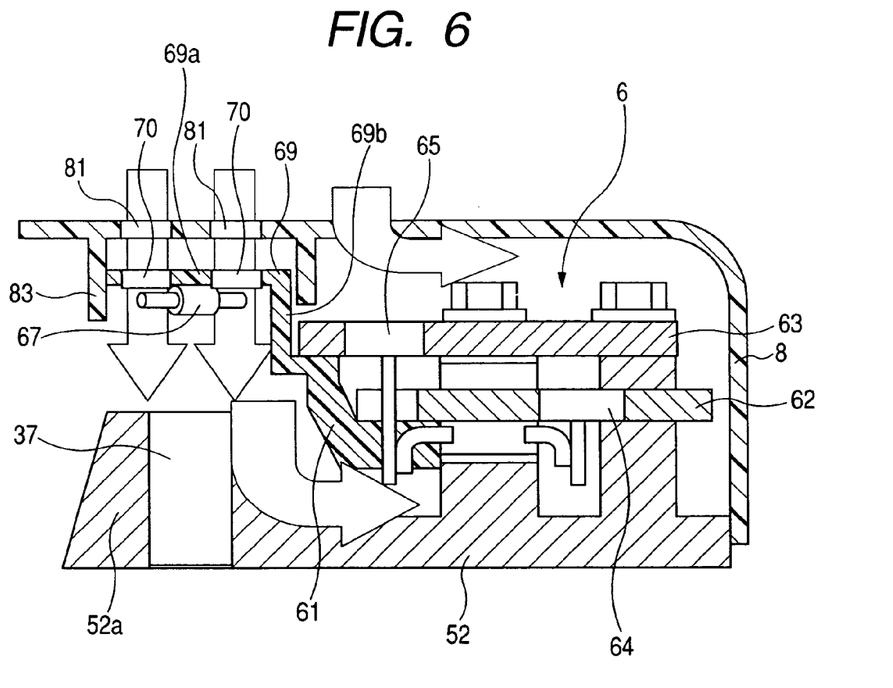
FIG. 6 is a partially cross-sectional view showing part of the rectifier and the rear cover in assembled state.

FIGS. 3-5 show the detailed configuration of the rectifier 6; FIG. 6 shows part of the rectifier 6 and the rear cover 8 in assembled state.

As shown in FIGS. 3-6, the rectifier 6 includes a terminal block 61, a positive-side heat sink 62, a negative-side heat sink 63, six positive-side diodes 64, and six negative-side diodes 65. The positive-side and negative-side diodes 64 and 65 constitute the main diodes of the rectifier 6.

The positive-side and negative-side heat sinks 62 and 63 are spaced from each other in the axial direction of the rotary shaft 31 with the terminal block 61 interposed therebetween.

Each of the positive-side diodes 64 is press-fitted in one of six through-holes formed in the positive-side heat sink 62.

Similarly, each of the negative-side diodes 65 is press-fitted in one of six through-holes formed in the negative-side heat sink 63.

The positive-side and negative-side diodes 64 and 65 together form two three-phase full-wave rectification circuits. More specifically, three of the positive-side diodes 64 and three of the negative-side diodes 65 together form one of the rectification circuits; the remaining three positive-side diodes 64 and three negative-side diodes 65 together form the other. The two rectification circuits work to full-wave rectify the three-phase AC power output from the stator winding 22 and output the resultant DC power to external through an output terminal 66 that is fixed to the positive-side heat sink 62.

In the present embodiment, the rectifier 6 further includes three auxiliary diodes 67 that work to rectify the three-phase AC power output from the stator winding 22 and supply the resultant DC power as the field current to the field winding 4. The auxiliary diodes 67 are mounted to the terminal block 61.

The terminal block 61 includes a plurality of metal terminals 68 and a retention portion 69.

The terminals 68 are provided for making electrical connection to the positive-side diodes 64, the negative-side diodes 65, and the auxiliary diodes 67.

The retention portion 69 is provided to retain therein the auxiliary diodes 67. More specifically, the retention portion 69 has a concave shape with a bottom surface 69a and a side wall 69b. The bottom surface 69a has the auxiliary diodes 67 arranged thereon and two air intake holes 70 formed therethrough. The side wall 69b functions as a barrier to block heat transfer from the positive-side and negative-side heat sinks 62 and 63 to the auxiliary diodes 67.

The rear cover 8 has a plurality of air intake holes 81 formed therethrough and an air guide wall 83 protruding from the inner surface thereof. The air intake holes 81 are provided for introducing cooling air into the inside of the alternator 1. The air guide wall 83 is cylindrical in shape and made, for example, of a resin material. The air guide wall 83 is provided to guide the cooling air introduced through the air intake holes 81 to the air intake holes 70 of the retention portion 69 of the terminal block 61. In addition, the rear cover 8 further has a plurality of air intake windows (not shown) for introducing cooling air to the positive-side and negative-side heat sinks 62 and 63.

During operation of the alternator 1, the cooling fan 53 rotates with rotation of the rotary shaft 31, thereby introducing cooling air into the inside of the alternator 1 through the air intake holes 81 of the rear cover 8. The introduced cooling air is then guided by the air guide wall 83 of the rear cover 8 to the air intake holes 70 of the retention portion 69 of the terminal block 61, and flows into the inner space of the retention portion 69 through the air intake holes 70 to cool the auxiliary diodes 67. Thereafter, the cooling air passes along the surface of the rear end portion 52a of the rear housing 52, in which the bearing 37 is provided, and reaches the inside of the rear housing 52.

Figure 7:
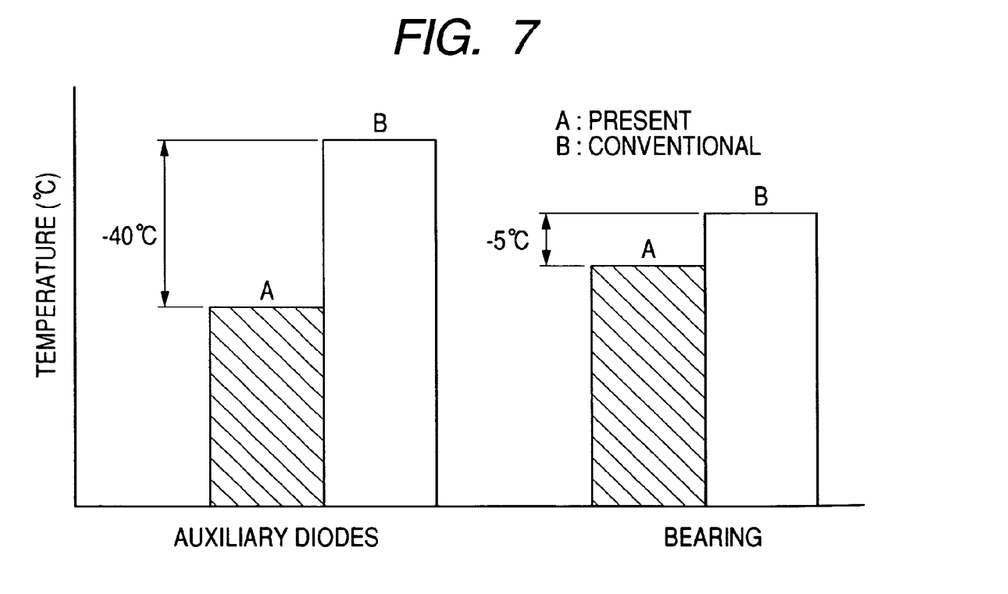
FIG. 7 is a graphical representation giving comparison in temperatures of auxiliary diodes and a bearing between the brushless automotive alternator according to the embodiment of the invention and a conventional brushless automotive alternator.

FIG. 7 gives a comparison in temperatures of the auxiliary diodes 67 and the bearing 37 between the alternator 1 according to the present embodiment and a conventional brushless automotive alternator. The temperature measurements for both alternators were made under an ambient temperature of 105° C.

It can be seen from FIG. 7 that the temperatures of the auxiliary diodes 67 and the bearing 37 in the alternator 1 were lower than those in the conventional alternator respectively by 40° C and 5° C.

As above, in the brushless automotive alternator 1 according to the present embodiment, the auxiliary diodes 67 are arranged in view of the fact that there is no brush assembly in a brushless automotive alternator.

More specifically, in a typical brushed automotive alternator, a brush assembly is generally mounted on a rear end portion of a rotary shaft; the rear end portion protrudes from a rear housing and is located between a bearing supporting the rotary shaft and a rear cover in the axial direction of the rotary shaft. In other words, the brush assembly is arranged in an axial space between the bearing and the rear cover. In comparison, a brushless automotive alternator has no brush assembly, and thus the axial space between the bearing and the rear cover is available for other uses.

In view of the above, in the brushless automotive alternator 1, the auxiliary diodes 67 are arranged in the axial space between the bearing 37 and the rear cover 8 and kept away from the positive-side and negative-side heat sinks 62 and 63.

With the above arrangement, it is possible to minimize heat transfer from the positive-side and negative-side heat sinks 62 and 63 to the auxiliary diodes 67, thereby minimizing the temperature of the auxiliary diodes 67.

More specifically, in the brushless automotive alternator 1, the positive-side and negative-side diodes 62 and 63 are arranged outside the auxiliary diodes 67 in the radial direction of the rotary shaft 31 and away from the auxiliary diodes 67 in the axial direction of the rotary shaft 31.

Consequently, the auxiliary diodes 67 can be prevented from suffering directly from heat dissipated by the positive-side and negative-side diodes 62 and 63.

Further, in the brushless automotive alternator 1, the auxiliary diodes 67 are so arranged as not to align with each other in the axial direction of the rotary shaft 31.

With the above arrangement, the auxiliary diodes 67 will not align with each other in the direction of a cooling air flow created by the cooling fan 53, as shown in FIG. 6, thus avoiding reduction of the cooling effect.

In the brushless automotive alternator 1, the rear cover 8 has the air intake holes 81 formed therethrough, each of which is in alignment with at least one of the auxiliary diodes 67 in the axial direction of the rotary shaft 31.

With the above formation, it is possible to introduce fresh cooling air from the outside of the rear cover 8 (i.e., the outside of the alternator 1) directly to the auxiliary diodes 67 and the bearing 37, thereby effectively cooling them.

In the brushless automotive alternator 1, the terminal block 61 of the rectifier 6 has formed therein a barrier for blocking heat transfer from the positive-side and negative-side heat sinks 62 and 63 to the auxiliary diodes 67.

More specifically, the terminal block 61 includes the retention portion 69 for retaining the auxiliary diodes 67. The retention portion 69 is concave in shape and has the auxiliary diodes 67 arranged on the bottom surface 69a thereof.

With the above arrangement, the sidewall 69b of the retention portion 69 can serve as the barrier to block heat transfer from the positive-side and negative-side heat sinks 62 and 63 to the auxiliary diodes 67, while allowing cooling air to be introduced therealong to the auxiliary diodes 67 and the bearing 37.

Consequently, the temperatures of the auxiliary diodes 67 and the bearing 37 can be further effectively reduced.

In the brushless automotive alternator 1, the rear cover 8 further has formed therein the air guide wall 83 for guiding cooling air from the outside of the rear cover 8 to the auxiliary diodes 67.

With the air guide wall 83, it is possible to reliably introduce fresh cooling air from the outside of the rear cover 8 directly to the auxiliary diodes 67 and the bearing 37, thereby further effectively cooling them.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment, the cooling fan 53 is arranged outside the front housing 51.

However, the cooling fan 53 may also be arranged on the rotary shaft 31 inside both the front and rear housings 51 and 52.

Moreover, in the previous embodiment, the rear cover 8 and the rear housing 52 are provided in the form of separate components.

However, the rear cover 8 and the rear housing 52 may also be provided in the form of an integral component and accommodate therein the rectifier 6 and the regulator 7 to protect them from foreign matters.

Such modifications, changes, and improvements within the skill of the art are intended to be covered by the appended claims.

What is claimed is:

1. A brushless alternator comprising:
   a stationary field winding to create a magnetic flux;
   a rotor that has a rotary shaft and creates a rotating magnetic field with the magnetic flux created by the field winding;
   a bearing rotatably supporting an end portion of the rotary shaft;
   a stator to generate an AC power in the rotating magnetic field created by the rotor;
   a protective cover; and
   a rectifier covered by the protective cover, the rectifier including a plurality of main rectifying elements, a heat sink, and a plurality of auxiliary rectifying elements, the main rectifying elements to rectify the AC power generated by the stator to a first DC power that is to be output from the alternator to external, the heat sink having the main rectifying elements provided thereon to dissipate heat generated by operation of the main rectifying elements, the auxiliary rectifying elements to rectify the AC power generated by the stator to a second DC power to energize the field winding, the auxiliary rectifying elements being arranged in an axial space, the axial space located between the bearing and the protective cover and at least partially within a diameter of the bearing, and kept away from the heat sink, so as to minimize heat transfer from the heat sink to the auxiliary rectifying elements, wherein
   the protective cover has an air intake hole formed therethrough which is in alignment with one of the auxiliary rectifying elements in an axial direction of the rotary shaft.

2. The brushless alternator as set forth in claim 1, wherein the heat sink is arranged outside the auxiliary rectifying elements in a radial direction of the rotary shaft and away from the auxiliary rectifying elements in an axial direction of the rotary shaft.

3. The brushless alternator as set forth in claim 1, wherein the auxiliary rectifying elements are so arranged as not to align with each other in an axial direction of the rotary shaft.

4. The brushless alternator as set forth in claim 1, further comprising a barrier for blocking heat transfer from the heat sink to the auxiliary rectifying elements.

5. The brushless alternator as set forth in claim 4, wherein the rectifier further includes a terminal block that includes a plurality of terminals for making electrical connection to the main and auxiliary rectifying elements and a retention portion for retaining the auxiliary rectifying elements, and wherein the retention portion has a concave shape with a bottom surface, on which the auxiliary rectifying elements are arranged, and a side wall that serves as the barrier to block heat transfer from the heat sink to the auxiliary rectifying elements.

6. The brushless alternator as set forth in claim 1, wherein the protective cover has an air guide wall formed therein for guiding cooling air from outside of the alternator to the auxiliary rectifying elements.

7. The brushless alternator as set forth in claim 1, wherein the brushless alternator is designed for use in a motor vehicle.

* * * * *